United States Patent
Strandjord et al.

(10) Patent No.: US 7,855,789 B2
(45) Date of Patent: Dec. 21, 2010

(54) RFOG MODULATION ERROR CORRECTION

(75) Inventors: Lee K. Strandjord, Tonka Bay, MN (US); Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 285 days.

(21) Appl. No.: 12/167,056

(22) Filed: Jul. 2, 2008

(65) Prior Publication Data

US 2010/0002239 A1    Jan. 7, 2010

Related U.S. Application Data

(60) Provisional application No. 60/948,352, filed on Jul. 6, 2007.

(51) Int. Cl.
*G01C 19/72* (2006.01)
(52) U.S. Cl. ...................................... 356/461
(58) Field of Classification Search .......... 356/459–461
See application file for complete search history.

(56) References Cited

U.S. PATENT DOCUMENTS

| | | | | |
|---|---|---|---|---|
| 5,090,809 | A * | 2/1992 | Ferrar | 356/460 |
| 6,014,217 | A | 1/2000 | Sanders et al. | |
| 6,204,921 | B1 * | 3/2001 | Strandjord et al. | 356/460 |
| 2007/0133003 | A1 * | 6/2007 | Sanders et al. | 356/461 |

OTHER PUBLICATIONS

Carroll, et al., Backscatter and the Resonant Fiber-Optic Gyro Scale Factor, Journal of the Lightwave Technology, vol. 7, No. 12, Dec. 1989, pp. 1895-1900.
Carroll, et al., The Passive Resonator Fiber Optic Gyro and Comparison to the Interferometer Fiber Gyro, Fiber Optic Gyros 10th Anniversary Conference, Proc. SPIE, vol. 719, 169, 177, pp. 486-494 (1986).
Ezekiel, et al., Passive ring resonator laser gyroscope, Applied Physics Letters, vol. 30, No. 9, May 1, 1977, pp. 478-480.
Hotate et al., Drift reduction in an optical passive ring-resonator gyro, SPIE vol. 1585 Fiber Optic Gyros 15th Anniversary Conference (1991), pp. 116-127.

(Continued)

*Primary Examiner*—Michael A Lyons
(74) *Attorney, Agent, or Firm*—Fogg & Powers LLC

(57) ABSTRACT

Systems and methods for performing modulation error correction. An example system applies common phase/frequency modulation to first and second laser beams, a first intensity modulation to the first modulated beam, and a second intensity modulation to the second modulated beam. Signals outputted are demodulated according to the frequency of the common phase/frequency modulation. Then the first of these demodulated signals is demodulated based on the frequency of the intensity modulation of the first beam, and the second of these demodulated signals is demodulated based on the frequency of the intensity modulation of the second beam. Then, rate of rotation is determined based on demodulated signals. Frequencies of the intensity modulations are unequal and not harmonically related, and intensity modulation encodes each light beam with a unique signature.

19 Claims, 19 Drawing Sheets

OTHER PUBLICATIONS

Hotate, et al., Adjustment-Free Method to Eliminate the Noise Induced by the Backscattering in an Optical Passive Ring-Resonator Gyro, IEEE Photonics Technology Letter, vol. 2, No. 1, Jan. 1990, pp. 75-77.

Iwatsuki, et al., Effect of Rayleigh backscattering in an optical passive ring-resonator gyro, Applied Optics, vol. 23, No. 21, Nov. 1, 1984, pp. 3916-3924.

Kaiser, et al., Experimental developments in the RFOG, SPIE vol. 1367 Fiber Optic and Laser Sensors VIII (1990), pp. 121-126.

Sanders, et al., Passive ring resonator method for sensitive inertial rotation measurements in geophysics and relativity, Optical Society of America, Optics Letters, vol. 6, No. 11, Nov. 1981, pp. 569-571.

* cited by examiner

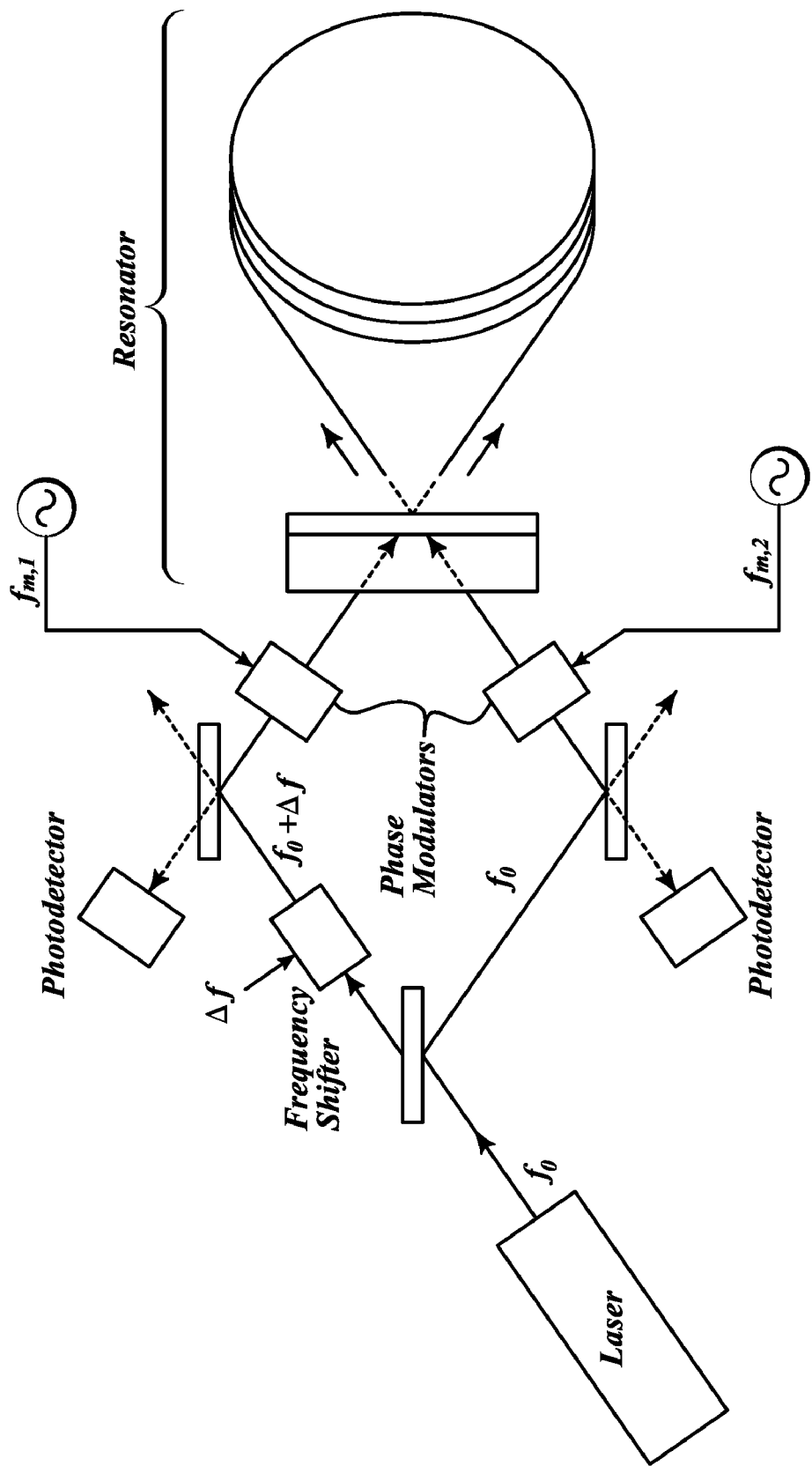
FIG. 6 *(PRIOR ART)*

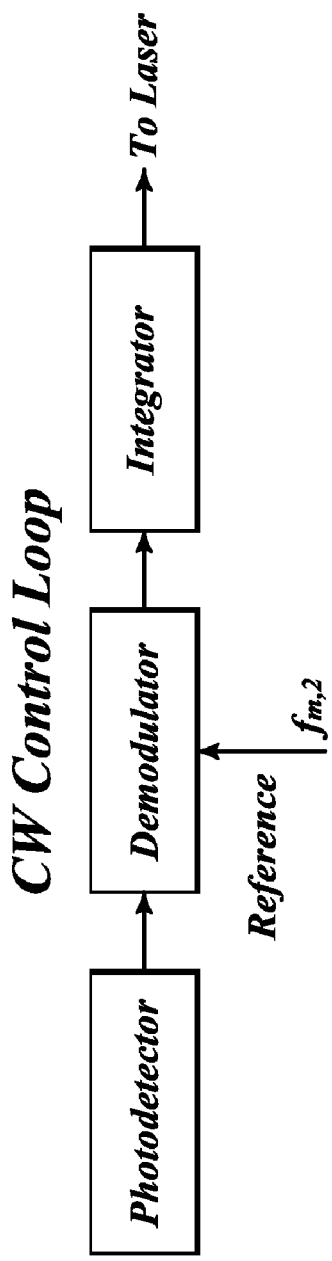
FIG.7-1 *(PRIOR ART)*
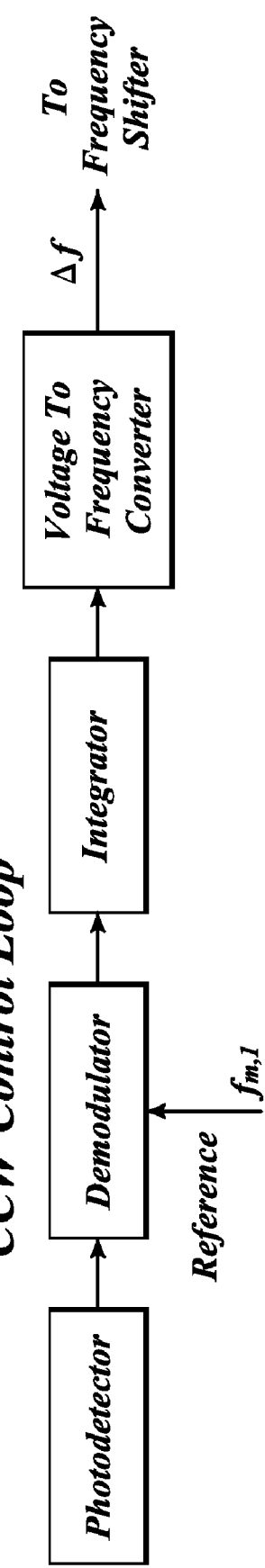
FIG.7-2 *(PRIOR ART)*

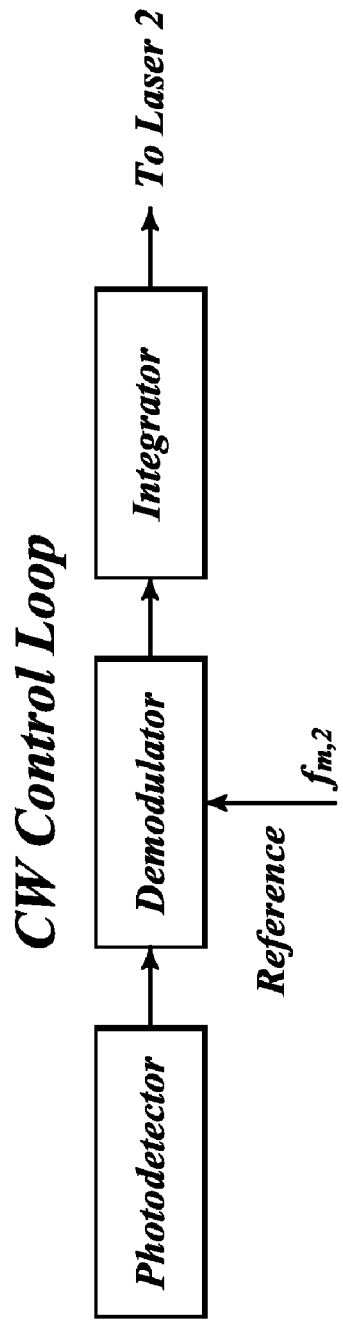
FIG.11-1 *(PRIOR ART)*
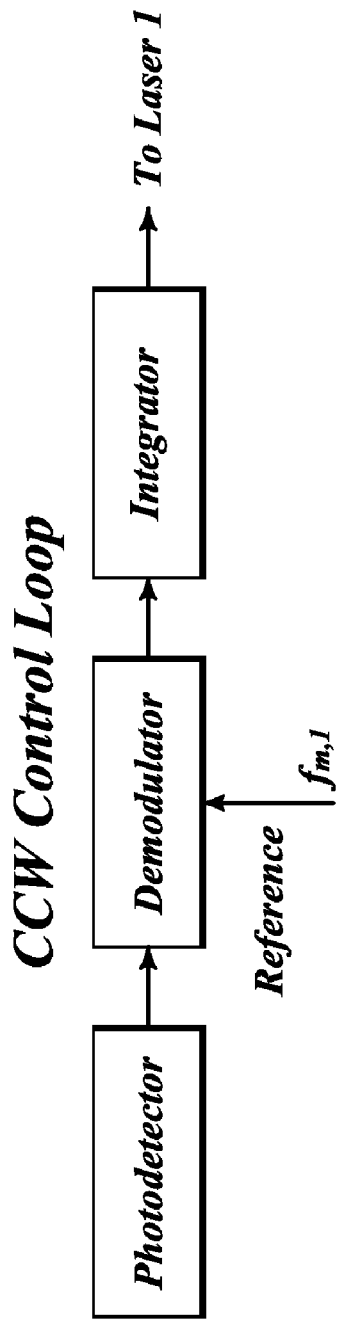
FIG.11-2 *(PRIOR ART)*

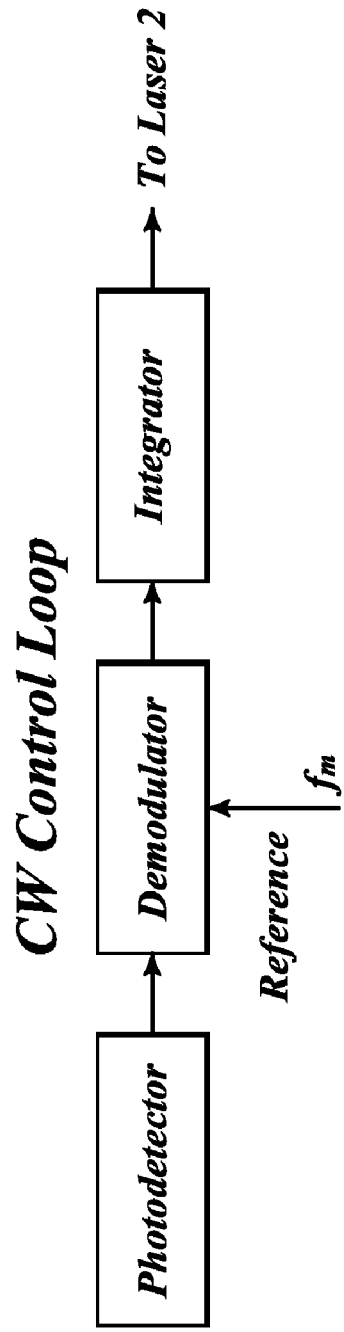
FIG.13-1 *(PRIOR ART)*
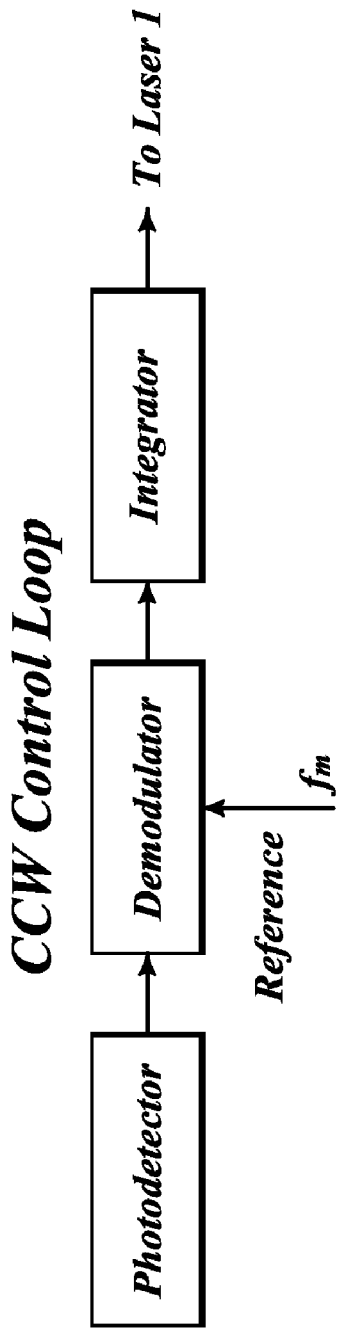
FIG.13-2 *(PRIOR ART)*

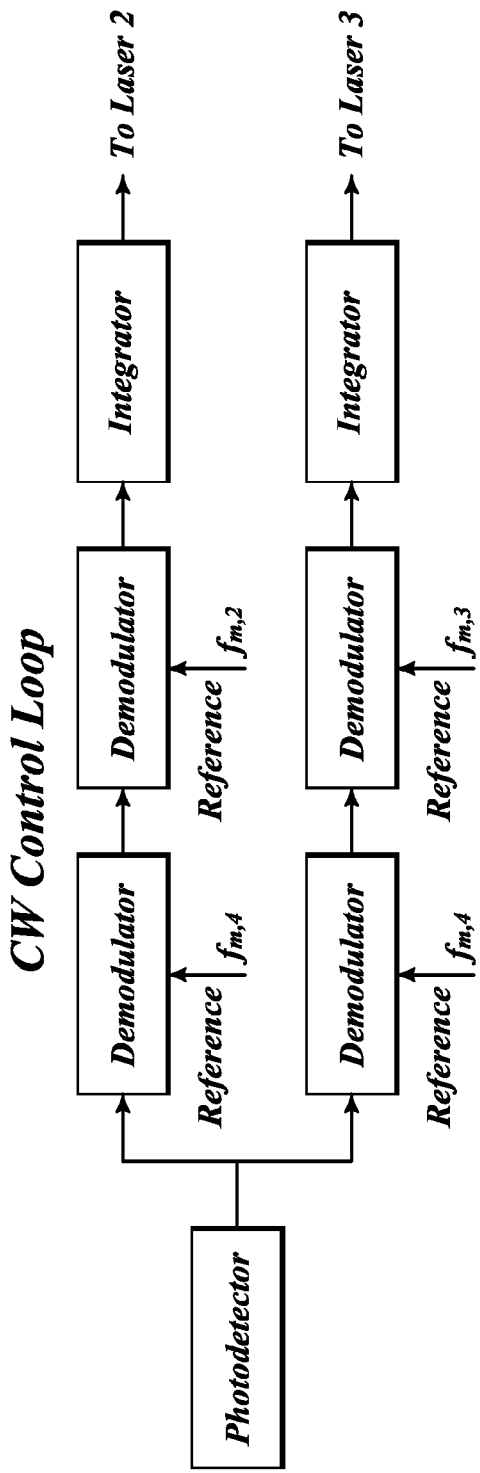
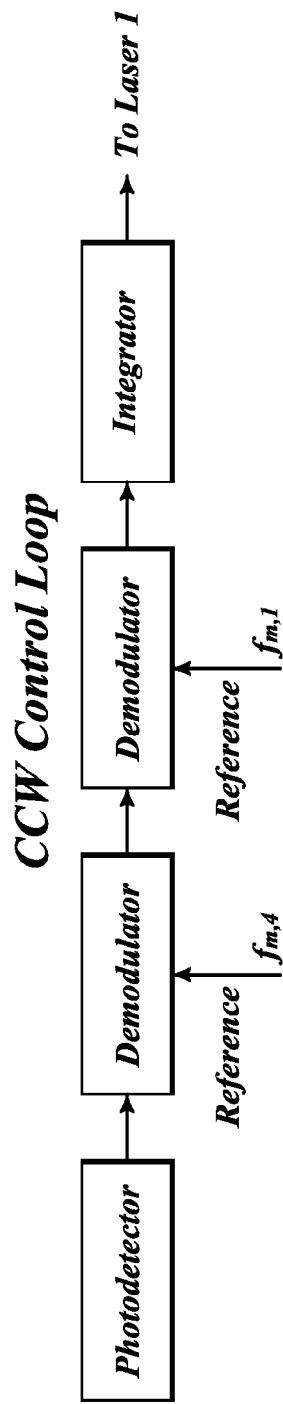
FIG.18-1
FIG.18-2

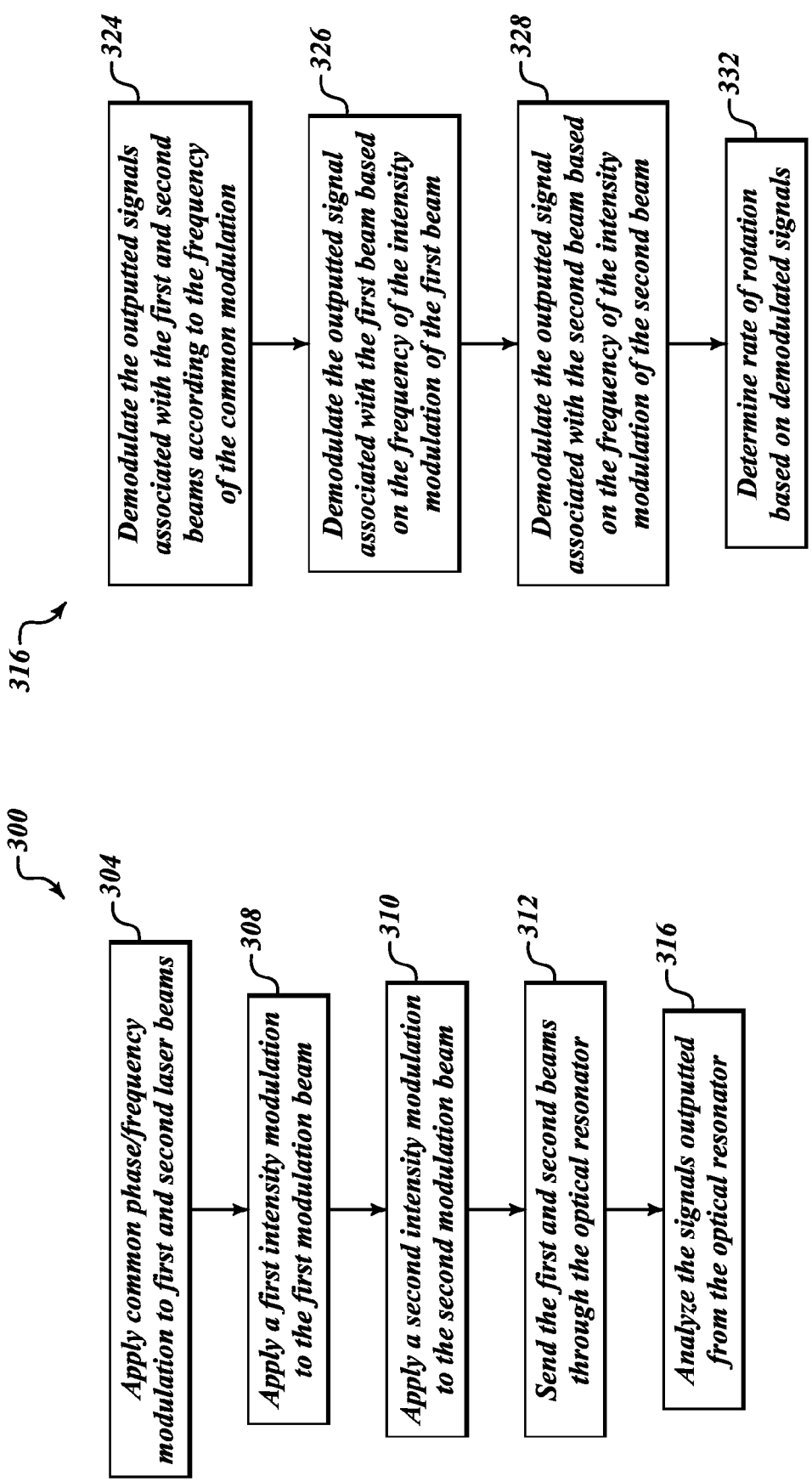

RFOG MODULATION ERROR CORRECTION

PRIORITY CLAIM

This invention claims the benefit of U.S. Provisional Application Ser. No. 60/948,352 filed Jul. 6, 2007, the contents of which are hereby incorporated by reference.

BACKGROUND OF THE INVENTION

The resonator fiber optic gyro (RFOG) senses rotation by detecting the frequency difference between clockwise and counterclockwise resonance frequencies of a fiber optic resonator. The resonance frequencies of the fiber resonator are probed with a narrow band laser or lasers. The resonator translates an optical frequency to an optical intensity. For example, for the reflection resonator as shown in FIG. 1, the light intensity detected by the photodetectors will be maximum when the optical frequency is away from the resonance frequency. However, when the optical frequency approaches the resonance frequency, the light intensity sharply dips to a minimum at the resonance frequency. Therefore, one method to detect the resonance frequency is to detect the minimum power at the detector. However, this method is not accurate enough for rotation sensing and thus another more precise method is needed.

A very precise measurement of the resonance frequency can be made by employing frequency modulation or phase modulation of the light, or by employing cavity length modulation of the resonator. FIG. 1 shows a prior art RFOG employing cavity length modulation. FIG. 2 shows how the modulation can give a precise measurement of the resonance frequency. Section (a) in FIG. 2 shows a resonance dip that would be observed at a photodetector if the frequency of the light is swept. Section (a) also shows the resonator response to sinusoidal frequency modulation at three different nominal optical frequencies. If the nominal optical frequency is to the right of the center of the resonance dip, then an intensity signal will be present at the photodetector that is at the modulation frequency and in-phase with the modulation. If the nominal optical frequency is to the left of the center of the resonance dip, then an intensity signal will be present at the photodetector that is at the modulation frequency, but 180 degrees out-of-phase with the modulation. For an ideal resonator and modulation, when the nominal optical frequency is at the center of the resonance dip, which is the resonance frequency, the intensity signal at the photodetector will not have a frequency component at the modulation frequency, but rather only at even harmonics of the modulation frequency. Therefore the detection of the resonance frequency is when the intensity signal at the modulation frequency is zero.

The photodetector converts the intensity signal into a voltage signal. If the voltage signal is passed through a demodulator (phase sensitive detector), the output of the demodulator as a function of nominal optical frequency will look like that shown in section (b) of FIG. 2. For an ideal case, the output of the demodulator passes through zero when the nominal optical frequency is exactly at the resonance frequency.

FIGS. 3-1 and 3-2 show an example of resonance tracking electronics that goes with FIG. 1. The CW signal from the photodetector is demodulated at frequency $f_m$. The output of the demodulator is an error signal that crosses through zero when the CW light wave is on a resonance frequency of the ring resonator. The error signal is integrated by an integrator. The output of the integrator controls the laser frequency to the resonator resonance frequency. The CCW control loop is similar, except the output of the integrator goes to a voltage-to-frequency converter, which output is at $\Delta f$ and is proportional to the rotation rate.

FIG. 4 shows an RFOG with common phase modulation of the laser light before it is split into the two beams that will counter propagate through the coil. There are many different phase modulators that can be used. Some examples are: a fiber wound around a PZT transducer, an integrated optics chip, or a bulk electro-optic modulator.

FIG. 5 shows an RFOG with common frequency modulation of the laser light before it is split into the two beams that will counter propagate through the coil. Some typical ways of modulating the laser frequency is by either modulating the injection current of a diode laser or diode pump laser, or by modulating the length of the laser cavity with a PZT or some type of MEMS device.

There are imperfections in the gyro that will cause an error in detecting the resonance frequency, thus an error in rotation sensing. There are two types of modulator imperfections that can result in rotation sensing errors. One type is modulator intensity modulation. Even though the intended modulation is either cavity length, optical frequency or optical phase, a non-ideal modulator will also generate a modulation of the light intensity which can have a component at the modulation frequency. The unwanted intensity modulation will be detected by the demodulator and interpreted as a signal indicating an off resonance condition. Resonator tracking electronics will then move the laser frequency away from the resonance frequency until the normal resonator intensity signal exactly cancels out the unwanted intensity signal. The deviation away from the resonance frequency results in a rotation sensing error if the unwanted intensity signals are different between the two counter-propagating light waves. However, if the unwanted intensity signals can be made the same, then no rotation sensing error will occur.

Another modulator imperfection that can result in rotation sensing errors is modulation distortion. The modulation distortion can occur at the modulator drive electronics or the modulator. An ideal modulation is a sinusoidal modulation at a single frequency. However, distortion can result in the generation of higher harmonics on the modulation. Even harmonic modulation will result in a resonance detection error which can lead to a rotation sensing error.

One way to reduce or eliminate rotation sensing errors due to modulator imperfections is to employ common modulation of the two counter-propagating light waves. This is done by using the same modulator for both counter-propagating light waves. FIGS. 1, 4 and 5 show various RFOG configurations employing common modulation. By using the same modulator, the resonance detection errors are the same for both the clockwise and counterclockwise directions. Since the rotation measurement is the difference between the detected clockwise and counterclockwise resonance frequencies, a common error will cancel out (common mode rejection) in the rotation measurement.

One drawback to common modulation is the gyro system becomes sensitive to other imperfections associated with optical back-reflection or backscatter within the resonator. Backscattered light will result in two types of errors. One type of error (interference-type) is associated with the optical interference between the backscattered wave and the primary wave that reaches the photodetector. The other type of error (intensity-type) is associated with the intensity of the backscattered wave, which is modulated by the modulation over the resonance dip just like the primary wave.

A method for eliminating the intensity-type error, which is found in the prior art, is to employ independent phase modulation of the counter propagating beams before they enter the resonator. This method is shown in FIG. 6. The frequency of the phase modulation of each beam is set to be different from each other and not harmonically related to each other. This way, the intensity signal of the backscatter light is not at the same frequency as the intensity signal of the primary wave, and can be rejected to a very high degree by a synchronous demodulator employed in the signal processing electronics. The disadvantage of employing independent modulation of the counter-propagating light waves is that modulator imperfections are no longer cancelled out through common mode rejection.

FIG. 7 shows an example of resonance tracking electronics that goes with FIG. 6. The CW signal from the photodetector is demodulated at frequency $f_{m,2}$. The output of the demodulator is an error signal that crosses through zero when the CW light wave is on a resonance frequency of the ring resonator. The error signal is integrated by an integrator. The output of the integrator controls the laser frequency to the resonator resonance frequency. The CCW control loop is similar, except the signal from the photodetector is demodulated at frequency $f_{m,1}$ the output of the integrator goes to a voltage-to-frequency converter, which output is at $\Delta f$ and is proportional to the rotation rate.

There exists a need to have an RFOG configuration that eliminates rotation sensing errors due to modulator imperfections and backscatter.

SUMMARY OF THE INVENTION

The present invention provides systems and methods for performing modulation error correction while maintaining rejection of intensity-type backscatter errors. An example system applies common phase/frequency modulation to first and second laser beams, a first intensity modulation to the first modulated beam, and a second intensity modulation to the second modulated beam. Then, the first and second beams are sent through the optical resonator. The signals outputted from the optical resonator are then analyzed.

Analysis includes demodulating the outputted signal associated with the first beam based on the frequency of the intensity modulation of the first beam, and demodulating the outputted signal associated with the second beam based on the frequency of the intensity modulation of the second beam. Then, the demodulated output signals are demodulated according to the frequency of the common phase/frequency modulation and rate of rotation is determined based on demodulated signals.

In one aspect of the invention, frequencies of the intensity modulations are unequal and not harmonically related, and intensity modulation encodes each light beam with a unique signature.

BRIEF DESCRIPTION OF THE DRAWINGS

Preferred and alternative embodiments of the present invention are described in detail below with reference to the following drawings:

FIGS. 1-7 and 10-13 illustrate various prior art embodiments;

FIGS. 8, 9 and 14-18 are schematic diagrams illustrating embodiments of the present invention; and FIGS. 19 and 20 are flow diagrams of an example process performed in accordance with the present invention.

DETAILED DESCRIPTION OF THE PREFERRED EMBODIMENT

Figure 8:
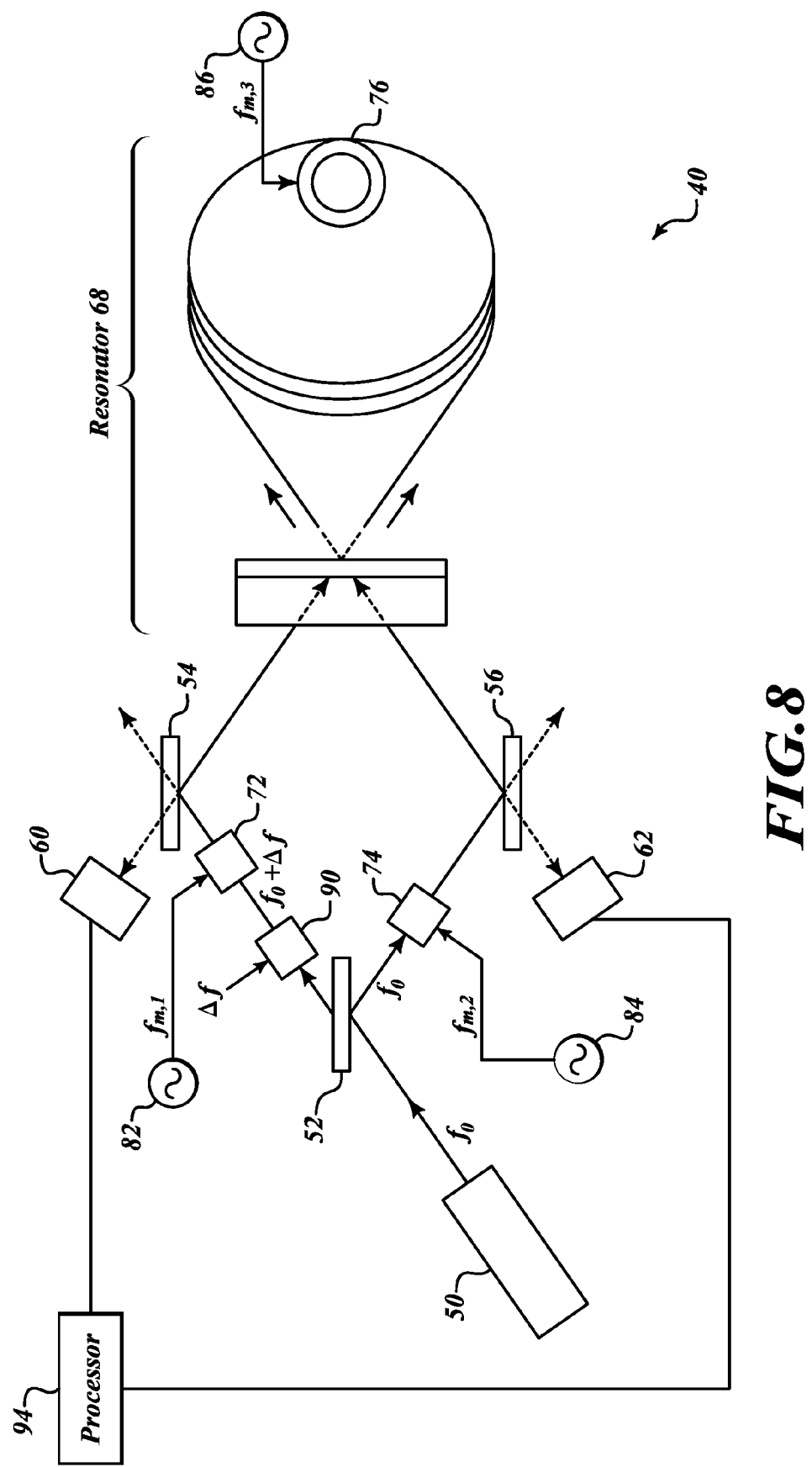

FIG. 8 shows an embodiment of the present invention that eliminates rotation sensing errors due to modulator imperfections and backscatter. An RFOG 40 includes a light source 50, beam splitters 52-56, photodetectors 60, 62, a resonator 68, modulators 72, 74, 76 with associate modulation generators 82, 84, 86, a frequency shifter 90, and a processor 94.

A common cavity length modulator 76 performs resonance detection and eliminating errors due to modulation imperfections. Cavity length modulation can be performed by a piezoelectric tube wrapped with resonator fiber, or a piezoelectric element placed on a resonator mirror. Independent intensity modulation (the intensity modulators 72, 74) of the two counter-propagating beams is used for encoding each light wave with a unique signature such that unwanted intensity signals due to backscatter can be rejected by signal processing. The frequencies of the intended intensity modulation are made different and not harmonically related. Thus, the frequency of the unwanted intensity signal due to backscatter will not be the same as the resonance signal of the primary wave, and thus will be rejected by signal demodulator included in the processor 94. The frequencies of the intended intensity modulations are set different and not harmonically related to each other and the common modulation performed by the cavity length modulator 76. The intended intensity modulations (the modulators 72, 74) can be sinusoidal or a square-wave. Examples of the intensity modulators 72, 74 include integrated optics intensity modulators including a Mach Zender interferometer, a MEMS based intensity modulator, or a Pockels cell followed by a polarizer. The intensity modulators 72, 74 can be implemented with any type of common modulation.

Figure 1:
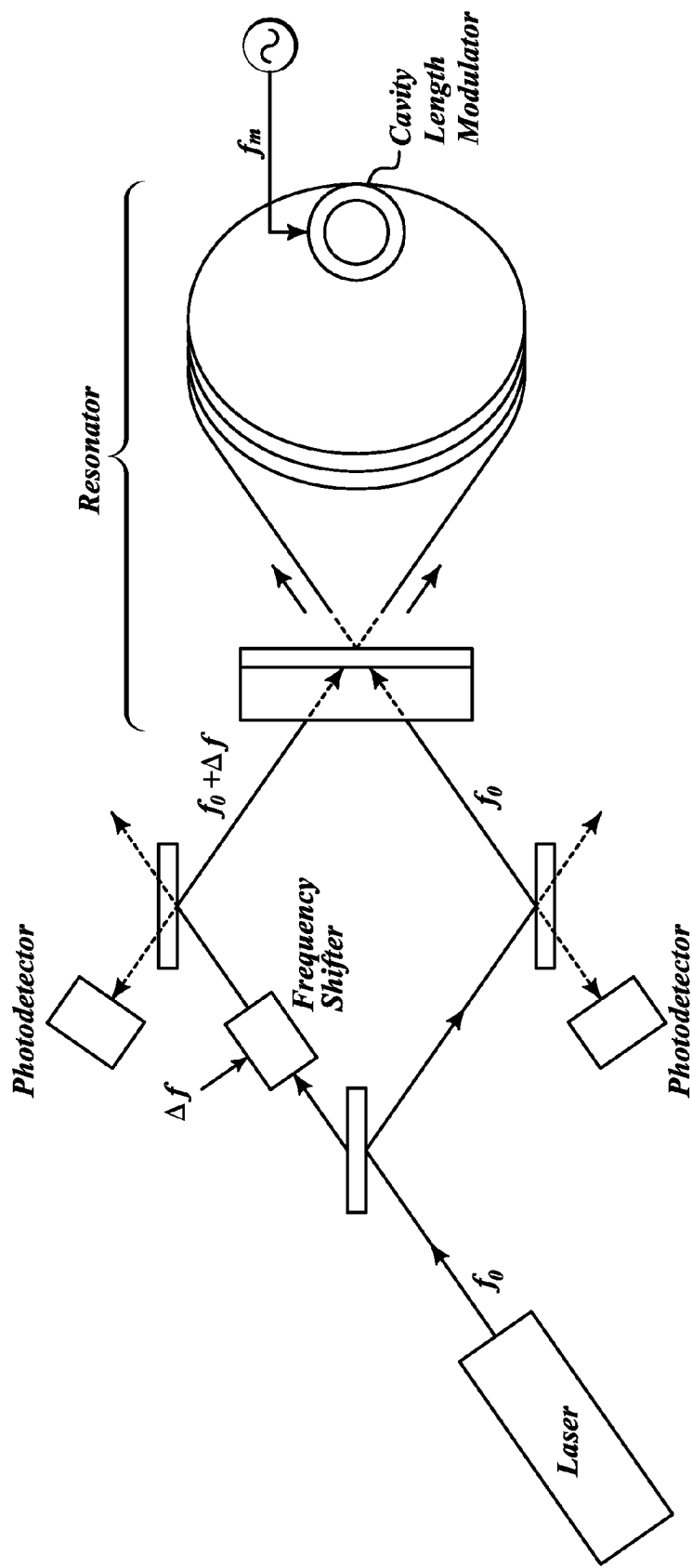
Figure 2:
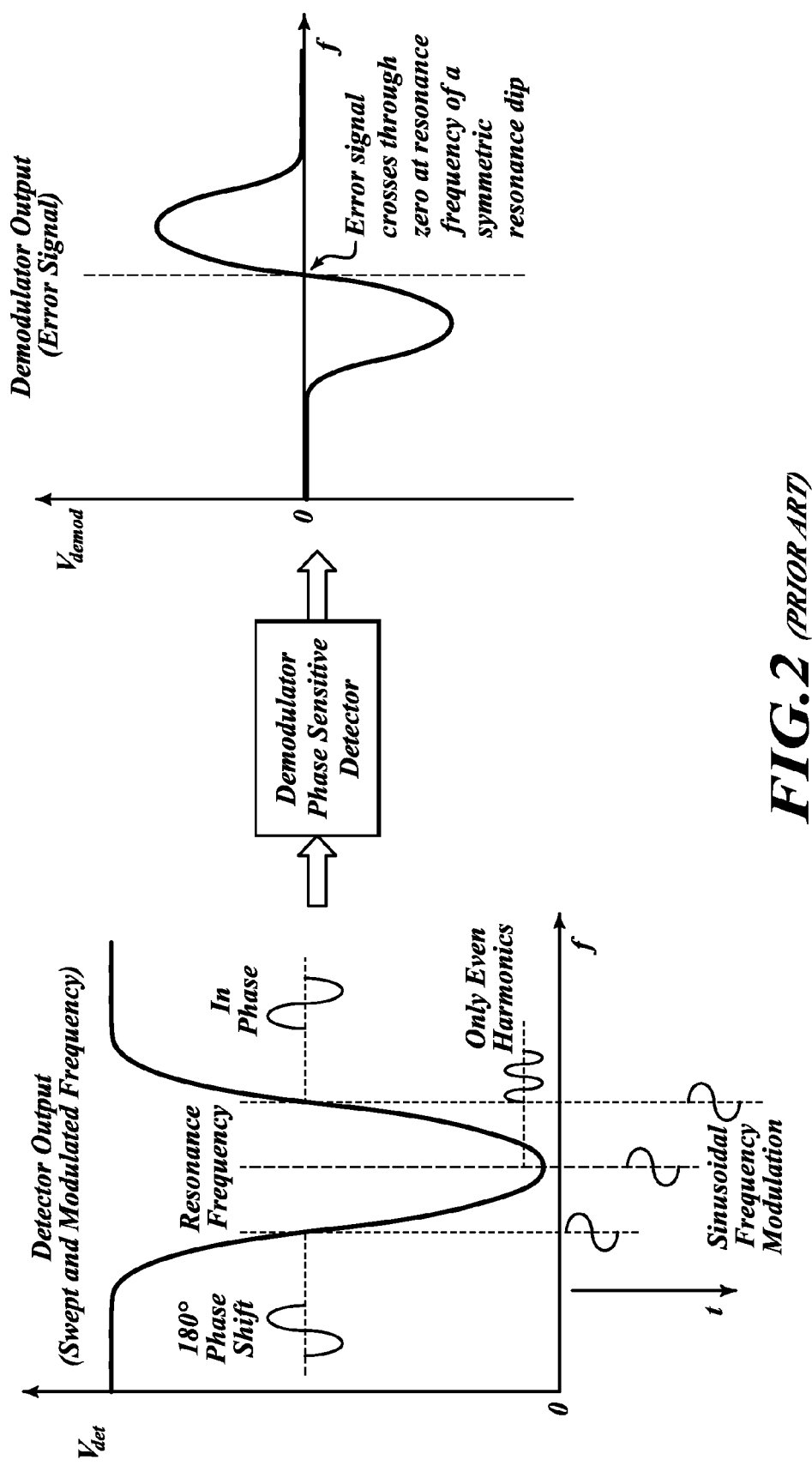
Figures 1, 3:
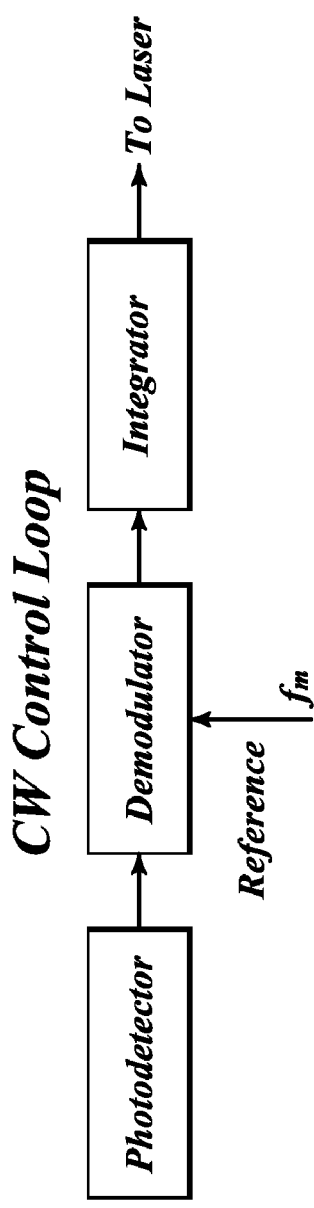
Figures 2, 3:
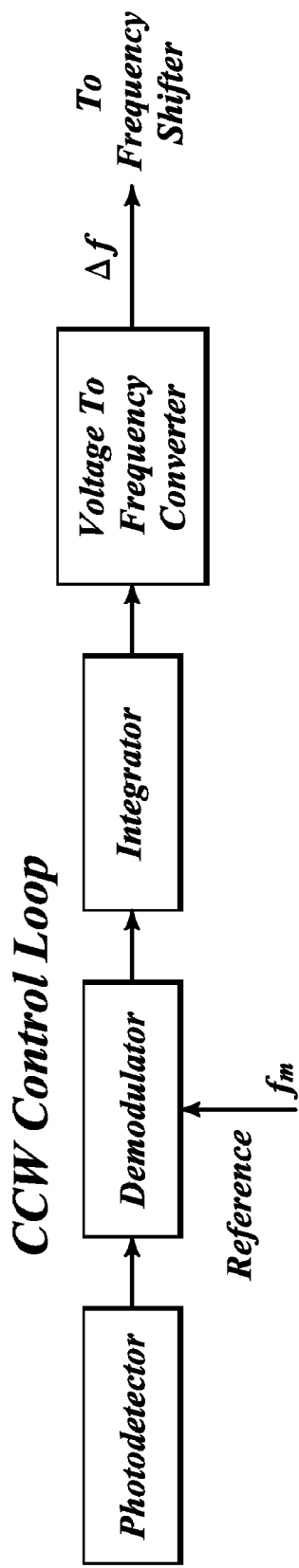
Figure 4:
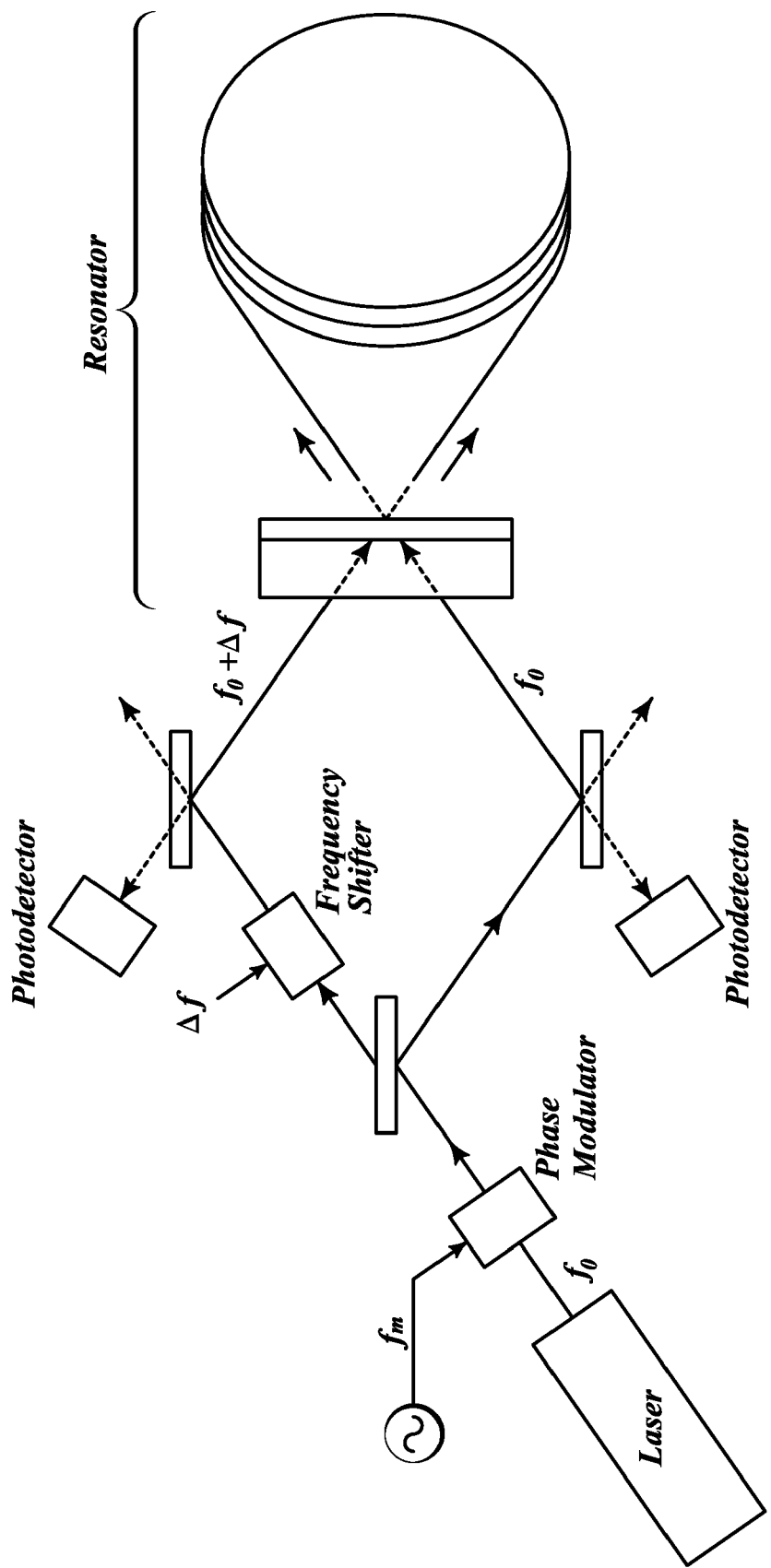
Figure 5:
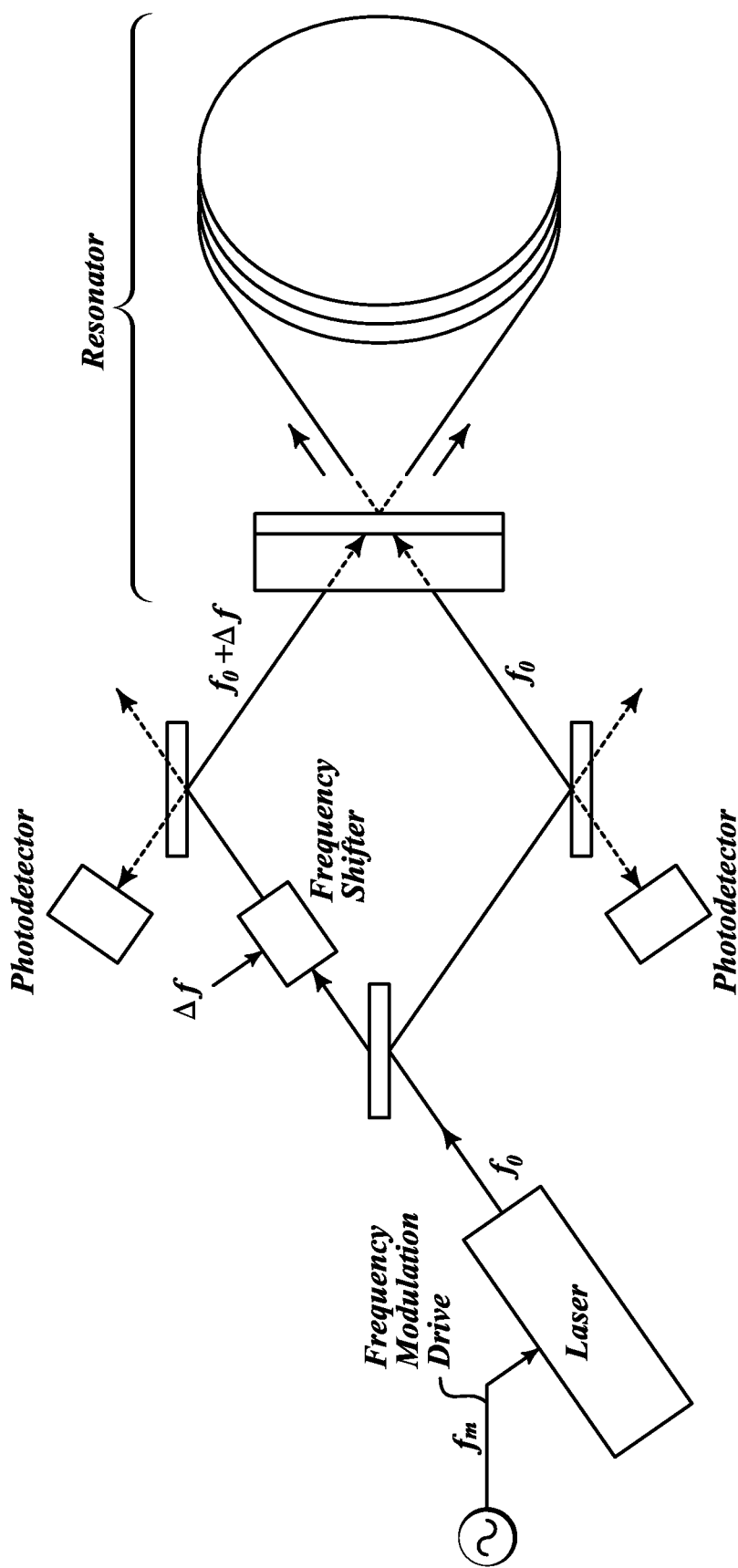
Figures 1, 9:
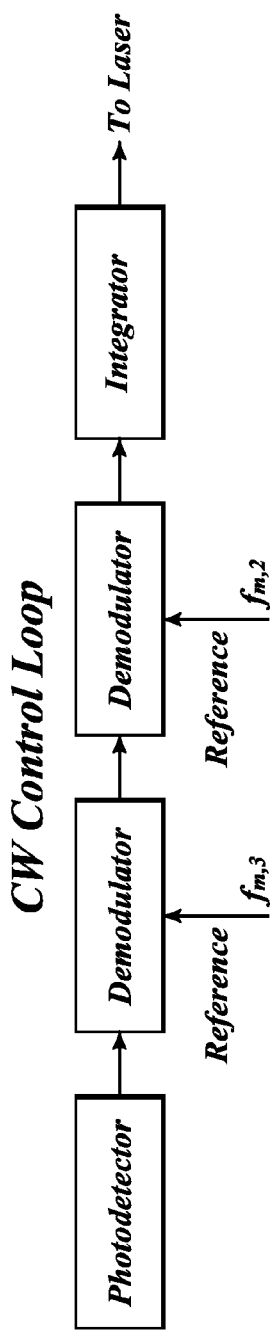
Figures 2, 9:
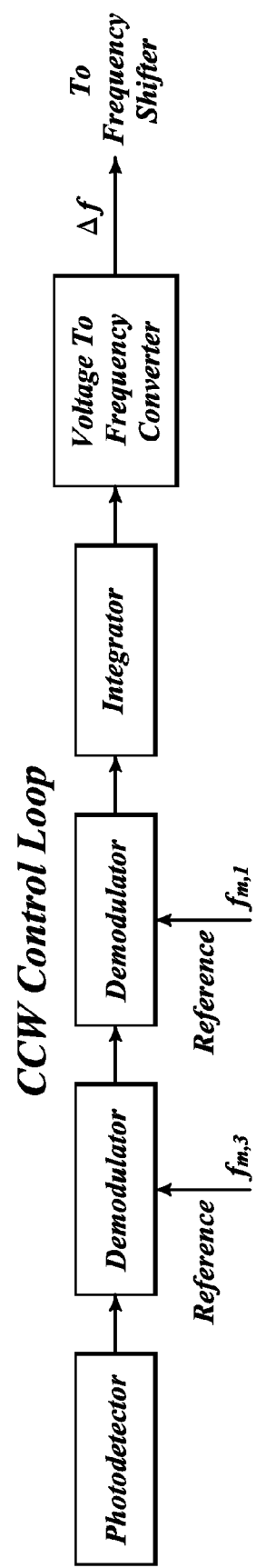

FIGS. 9-1 and 9-2 show an example of resonance tracking electronics that goes with FIG. 8. Both CW and CCW signals are demodulated at the common modulation frequency $f_{m,3}$. The CW signal from the photodetector is demodulated at frequency $f_{m,2}$. The output of the demodulator is an error signal that crosses through zero when the CW light wave is on a resonance frequency of the ring resonator. The error signal is integrated by an integrator. The output of the integrator controls the laser frequency to the resonator resonance frequency. The CCW control loop is similar, except the signal from the photodetector is demodulated at frequency $f_{m,1}$ the output of the integrator goes to a voltage-to-frequency converter, which output is at $\Delta f$ and is proportional to the rotation rate.

Figure 10:
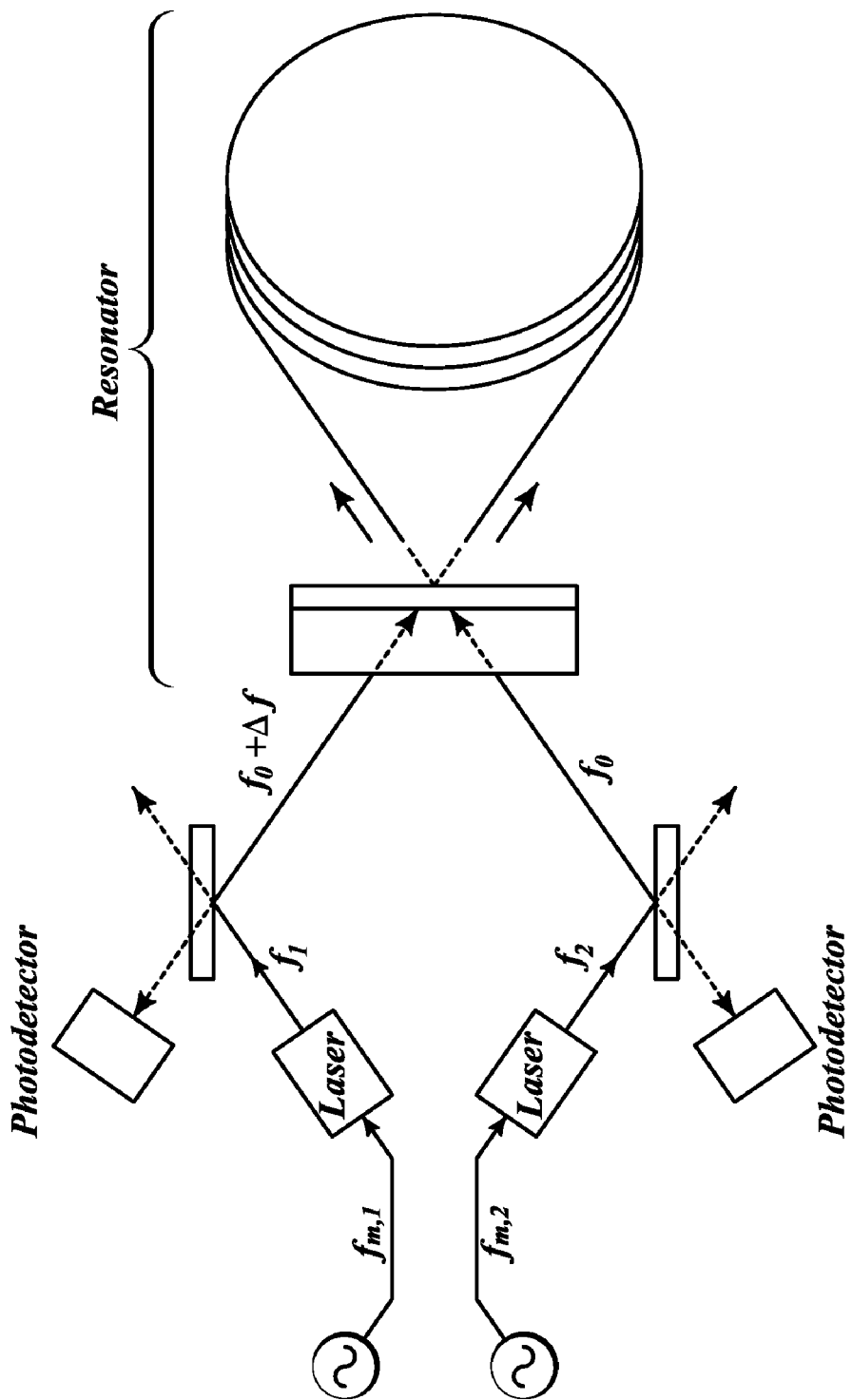

The interference-type of backscatter error can be reduced or eliminated by locking the clockwise light wave on a different resonance frequency than the counterclockwise light wave. This way the interference between the backscattered and primary waves will generate an error signal at a frequency that is equal to the frequency difference between the two waves. By locking onto different resonance frequencies corresponding to different resonance longitudinal modes, the frequency differences are very high, in the Mega-Hertz to Giga-Hertz range. Since the rotation measurement is typically done at frequencies below 100 Hz, the high frequency error due to interference-type backscatter can be easily rejected by low-pass filtering the gyro rotation signal. FIG. 10 is a prior art teaching that uses two lasers to lock onto different resonance frequencies. In this configuration each laser is modulated at a different frequency for resonance detection, and thus has the disadvantage of being sensitive to modulation imperfections.

FIGS. 11-1 and 11-2 show an example of resonance tracking electronics that goes with FIG. 10. The CW signal from the photodetector is demodulated at frequency $f_{m,2}$. The output of the demodulator is an error signal that crosses through zero when the CW light wave is on a resonance frequency of the ring resonator. The error signal is integrated by an integrator. The output of the integrator controls laser 2 frequency to the resonator resonance frequency. The CCW control loop is similar, except the signal from the photodetector is demodulated at frequency $f_{m,1}$ the output of the integrator controls laser 1 frequency to the resonator resonance frequency.

Figure 12:
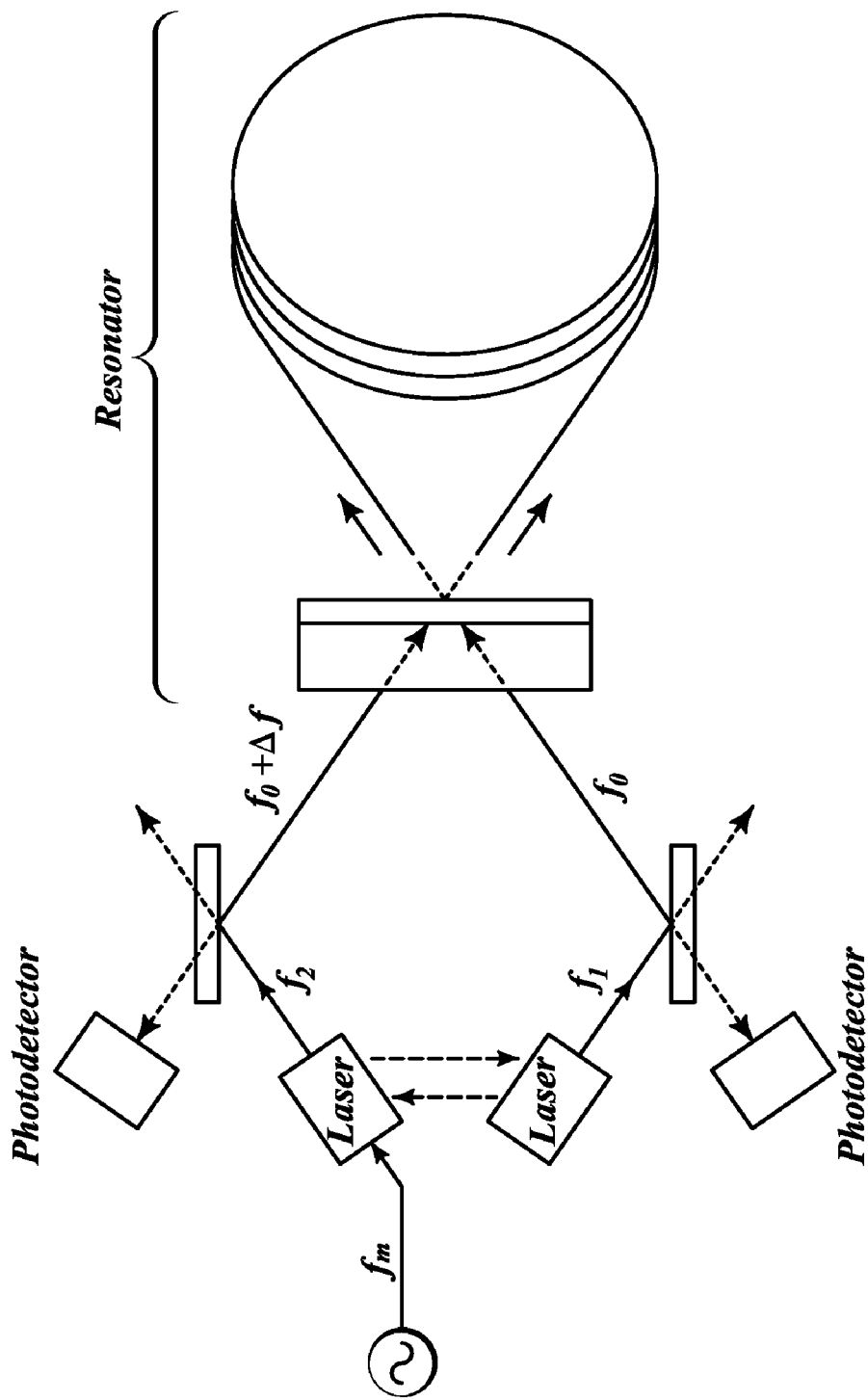

FIG. 12 shows the use of two lasers; a slave laser 122 that is phase locked to a master laser 120. This method can provide the two independent frequencies for operating at different resonance modes to reject the interference-type error. By phase locking the slave laser 122 to the master laser 120, a frequency modulation of the master laser 120 will also show up on the slave laser 122. This is not true common frequency modulation, but if a high bandwidth phase lock loop is employed, the modulation distortion will be mostly common between the master laser 120 and slave laser 122. Therefore, modulation distortion and backscatter errors can be reduced or eliminated for a two or more laser configuration if independent intensity modulation is employed. One drawback to this configuration is that unwanted intensity modulation of the two lasers may still have a significant uncommon component that will not be eliminated by common mode rejection.

FIGS. 13-1 and 13-2 show an example of resonance tracking electronics that goes with FIG. 12. The CW signal from the photodetector is demodulated at frequency $f_m$. The output of the demodulator is an error signal that crosses through zero when the CW light wave is on a resonance frequency of the ring resonator. The error signal is integrated by an integrator. The output of the integrator controls laser 2 frequency to the resonator resonance frequency. The CCW control loop is similar, except the output of the integrator controls laser 1 frequency to the resonator resonance frequency.

Figure 14:
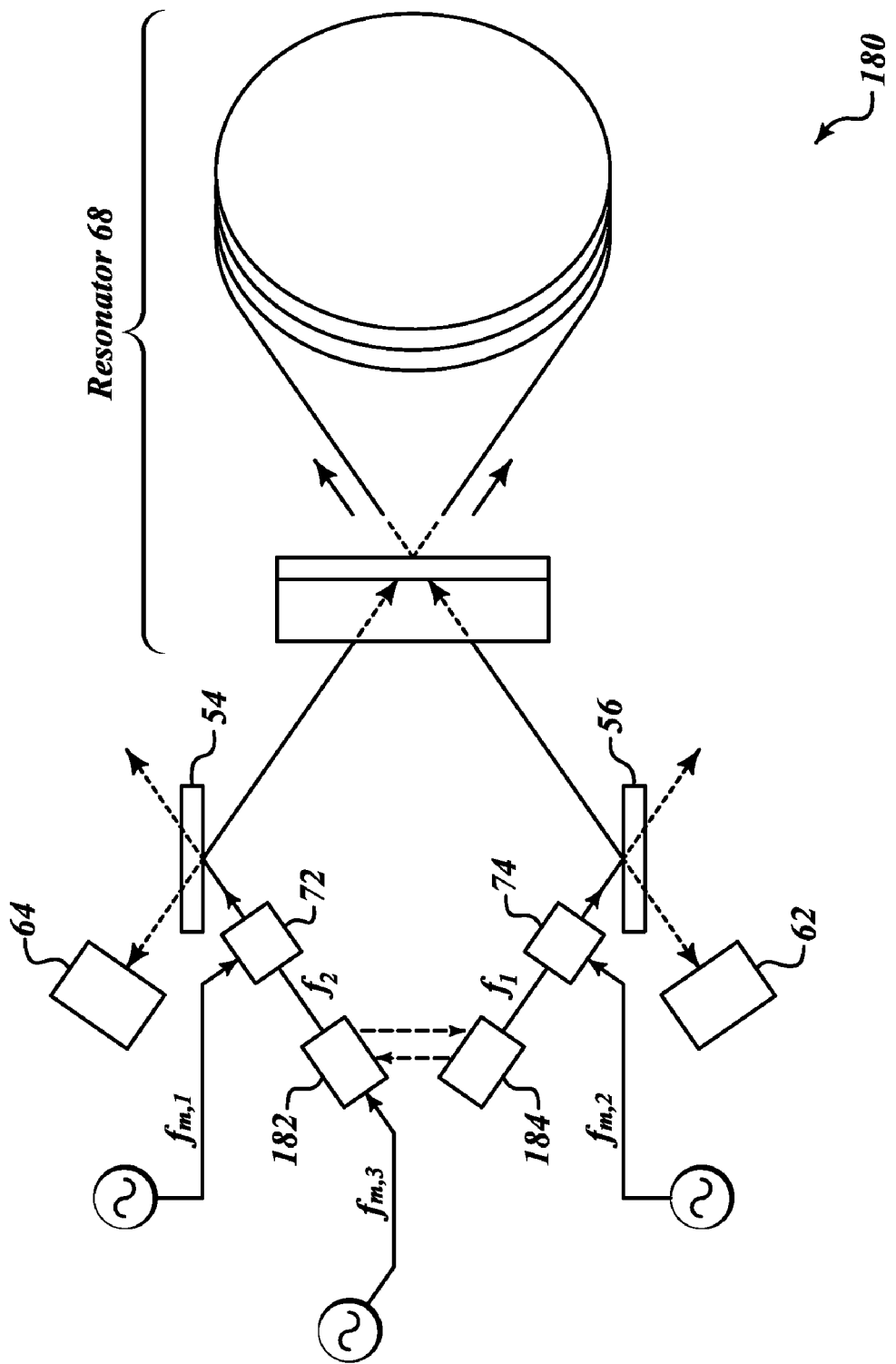

FIG. 14 shows an example of the invention employed with a two laser configuration 180. One drawback to this configuration is that unwanted intensity modulation of two lasers 182, 184 may still have a significant uncommon component that will not be eliminated by common mode rejection. However, other ways to reduce the effects of unwanted intensity modulation, such as the use of intensity control by employing an intensity servo loop, can be employed.

Figures 1, 15:
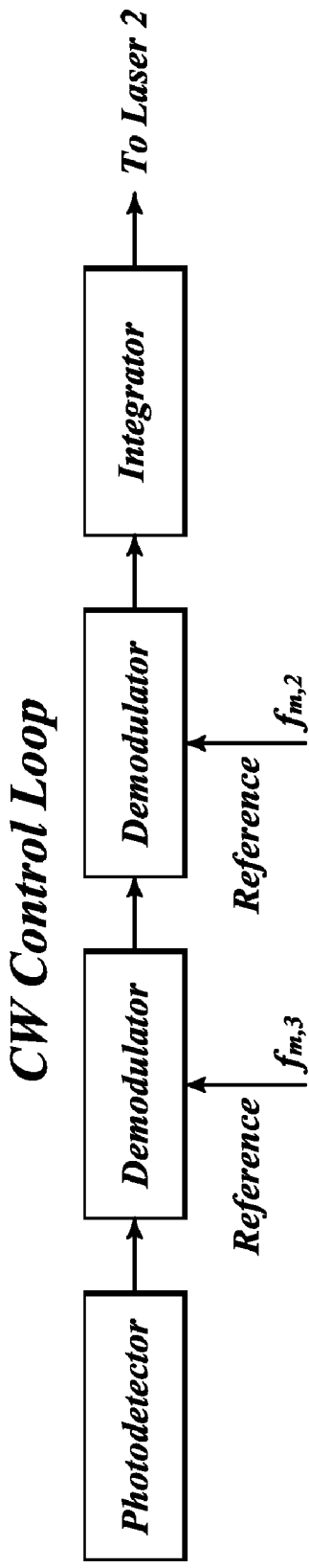
Figures 2, 15:
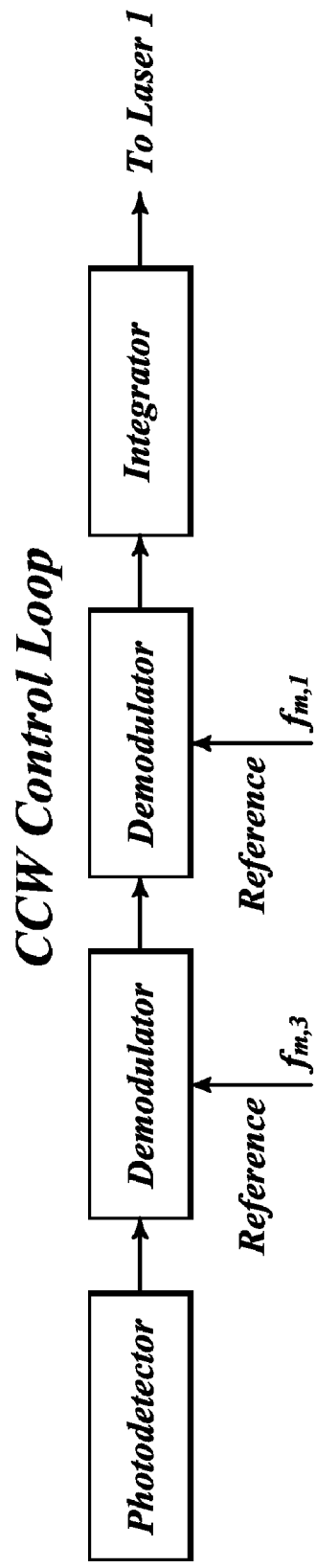

FIGS. 15-1 and 15-2 show an example of resonance tracking electronics for the system of FIG. 14. Both CW and CCW signals are demodulated at the common modulation frequency $f_{m,3}$. The CW signal from the photodetector is demodulated at frequency $f_{m,2}$. The output of the demodulator is an error signal that crosses through zero when the CW light wave is on a resonance frequency of the ring resonator. The error signal is integrated by an integrator. The output of the integrator controls laser 2 frequency to the resonator CW resonance frequency. The CCW control loop is similar, except the signal from the photodetector is demodulated at frequency $f_{m,1}$ the output of the integrator controls laser 1 frequency to the resonator CCW resonance frequency.

Figure 16:
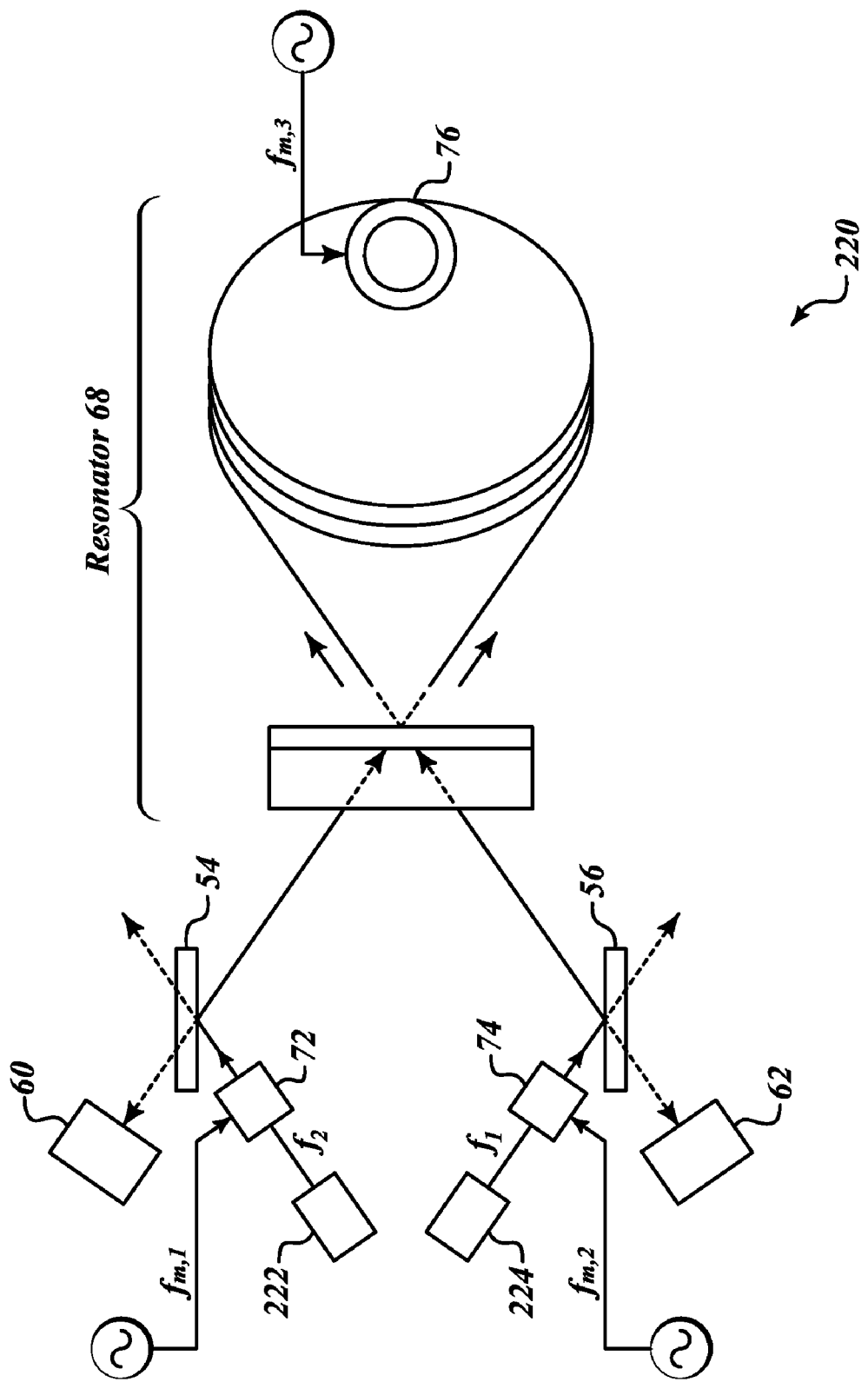

FIG. 16 shows an RFOG configuration 220 employing common cavity length modulation, independent intensity modulation and the use of two lasers 222, 224.

Figure 17:
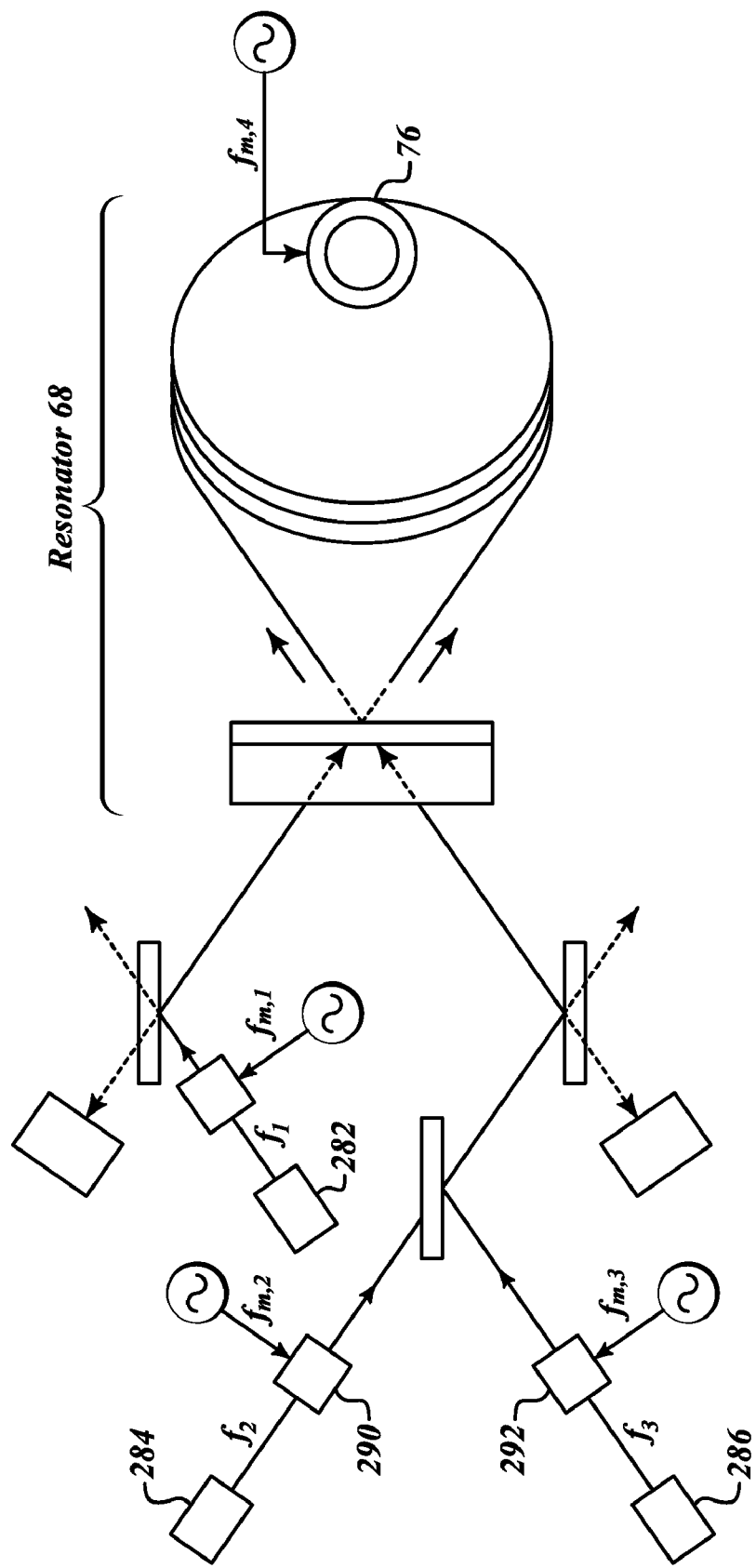

FIG. 17 shows a similar configuration 280 but with three lasers 282-286. The advantage of these two configurations is multiple rotation sensing errors are reduced or eliminated. The common cavity length modulation eliminates errors due to modulator imperfections, the independent intensity modulation eliminates intensity-type errors due to backscatter, and the use of multiple lasers affords a means for eliminating interference-type errors due to backscatter. Furthermore, in the three-laser configuration 280, independent intensity modulators 290, 292 encode each laser beam with a unique signature that allows the signal processing to separate the signals associated with the second laser 284 and the third laser 286, both which send light in the same direction in the resonator and onto the same photodetector.

FIGS. 18-1 and 18-2 show an example of resonance tracking electronics for the system shown in FIG. 17. The CW signal from the photodetector is split into two channels. Both channels are demodulated at the common modulation frequency $f_{m,4}$. The channel that is used to control Laser 2 is then demodulated at $f_{m,2}$. The channel that is used to control Laser 3 is demodulated at $f_{m,3}$. The CCW signal is demodulated at $f_{m,4}$ then at $f_{m,1}$. The output of the integrator controls laser 1 frequency to the resonator CCW resonance frequency.

FIG. 19 illustrates an example process 300 performed by a processor (e.g., the processor 94) included in the systems shown above. First, at a block 304, a common phase/frequency modulation is applied to first and second laser beams. At a block 308, a first intensity modulation is applied to the first modulated beam. At a block 310, a second intensity modulation is applied to the second modulated beam. At a block 312, the first and second beams are sent through the optical resonator. At a block 316, the signals outputted from the optical resonator are analyzed, see FIG. 20.

FIG. 20 illustrates the process performed at the block 316 of FIG. 19. First, at block 324, the outputted signals associated with the first and second beams are demodulated according to the frequency of the common modulation. Then at block 326, the signal associated with the first beam is demodulated based on the frequency of the intensity modulation of the first beam. At block 328, the outputted signal associated with the second beam is demodulated based on the frequency of the intensity modulation of the second beam. At block 332, rate of rotation is determined based on demodulated signals. The steps of the demodulation can be performed in various orders.

While the preferred embodiment of the invention has been illustrated and described, as noted above, many changes can be made without departing from the spirit and scope of the invention. For example, the processors may be analog and/or digital processors. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A resonator fiber optic gyro (RFOG) comprising:
   at least one laser configured to generate at least two light waves;
   a resonator having an optical fiber loop, the resonator configured to allow the light waves generated by the at least one laser to travel in clockwise (cw) and counter-clockwise (ccw) directions in the optical fiber loop;
   at least two intensity modulators configured to perform intensity modulation of the light waves before introduction into the resonator;
   two photodetectors configured to detect components of the light waves rotating cw and ccw in the resonator; and
   a processor in signal communication with the photodetectors, the processor configured to reject intensity signals due to backscatter based on the intensity modulations and determine rate of rotation based on the detected components.

2. The RFOG of claim 1, wherein the resonator further comprises a cavity length modulator configured to reduce errors due to modulation imperfections,
wherein the at least one laser comprises only one laser and a beam splitter configured to split a light wave generated by the laser into two light waves, and
wherein the at least two intensity modulators comprises two intensity modulators, one for modulating the one of the split light waves and the other for modulating the other of the split light waves.

3. The RFOG of claim 2, wherein frequencies of the intensity modulations for the light waves are unequal and not harmonically related.

4. The RFOG of claim 3, wherein the intensity modulators encode each light wave with a unique signature.

5. The RFOG of claim 1, wherein the at least one laser comprises:
a master laser configured to generate a light wave;
a slave laser configured to generate a light wave; and
a phase lock loop configured to lock the phase of the light wave generated by the slave laser to the light wave generated by the master laser.

6. The RFOG of claim 5, wherein frequencies of the intensity modulations for the light waves are unequal and not harmonically related.

7. The RFOG of claim 6, wherein the intensity modulators encode each light wave with a unique signature.

8. The RFOG of claim 1, wherein the at least one laser comprises two lasers and the at least two intensity modulators comprises two intensity modulators, and wherein the resonator further comprises a cavity length modulator configured to reduce errors due to modulation imperfections.

9. The RFOG of claim 8, wherein frequencies of the intensity modulations for the light waves are unequal and not harmonically related.

10. The RFOG of claim 9, wherein the intensity modulators encode each light wave with a unique signature.

11. The RFOG of claim 1, wherein the at least one laser comprises three lasers and the at least two intensity modulators comprises three intensity modulators, each of the three intensity modulators being associated with a respective one of the three lasers, wherein outputs of two of the intensity modulators is selectively supplied to one of the cw or ccw direction in the resonator, and wherein the resonator further comprises a cavity length modulator configured to reduce errors due to modulation imperfections.

12. The RFOG of claim 11, wherein frequencies of the intensity modulations for the light waves are unequal and not harmonically related.

13. The RFOG of claim 12, wherein the intensity modulators encode each light wave with a unique signature.

14. A method comprising:
applying common phase/frequency modulation to first and second laser beams;
applying a first intensity modulation to the first modulated beam;
applying a second intensity modulation to the second modulated beam;
sending the first intensity modulated beam through an optical resonator in a clockwise (cw) direction;
sending the second intensity modulated beam through the optical resonator in a counter-clockwise (ccw) direction; and
analyzing the signals outputted from the optical resonator to determine rate of rotation and reject intensity signals due to backscatter based on the intensity modulations.

15. The method of claim 14, wherein analyzing comprises:
demodulating the outputted signal associated with the first beam based on the frequency of the intensity modulation of the first beam;
demodulating the outputted signal associated with the second beam based on the frequency of the intensity modulation of the second beam;
demodulating the demodulated output signals according to the frequency of the common phase/frequency modulation; and
determining rate of rotation based on demodulated signals.

16. The method of claim 15, wherein frequencies of the intensity modulations are unequal and not harmonically related, wherein the intensity modulators encode each light beam with a unique signature.

17. A system comprising:
a means for applying common phase/frequency modulation to first and second laser beams;
a means for applying a first intensity modulation to the first modulated beam;
a means for applying a second intensity modulation to the second modulated beam;
a means for sending the first and second beams through the optical resonator; and
a means for analyzing the signals outputted from the optical resonator.

18. The system of claim 17, wherein the means for analyzing comprises:
a means for demodulating the outputted signal associated with the first beam based on the frequency of the intensity modulation of the first beam;
a means for demodulating the outputted signal associated with the second beam based on the frequency of the intensity modulation of the second beam;
a means for demodulating the demodulated output signals according to the frequency of the common phase/frequency modulation; and
a means for determining rate of rotation based on demodulated signals.

19. The system of claim 18, wherein frequencies of the intensity modulations are unequal and not harmonically related, wherein the intensity modulators encode each light beam with a unique signature.

* * * * *